(12) United States Patent
Tokuyama

(10) Patent No.: US 10,703,440 B2
(45) Date of Patent: Jul. 7, 2020

(54) BICYCLE REAR SPROCKET ASSEMBLY AND BICYCLE REAR SPROCKET

(71) Applicant: SHIMANO INC., Sakai (JP)

(72) Inventor: Koji Tokuyama, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 16/423,037

(22) Filed: May 27, 2019

(65) Prior Publication Data

US 2019/0276117 A1 Sep. 12, 2019

Related U.S. Application Data

(62) Division of application No. 14/838,427, filed on Aug. 28, 2015, now Pat. No. 10,407,126.

(51) Int. Cl.
*B62M 9/10* (2006.01)

(52) U.S. Cl.
CPC ..................... *B62M 9/10* (2013.01)

(58) Field of Classification Search
CPC ....................................................... B62M 9/10
USPC ........................................................ 474/160
See application file for complete search history.

(56) References Cited

U.S. PATENT DOCUMENTS

| | | | | |
|---|---|---|---|---|
| 5,772,547 A * | 6/1998 | Terada | ...................... | B62M 9/10 474/77 |
| 6,428,437 B1 * | 8/2002 | Schlanger | ................ | B62M 9/10 474/160 |
| 7,344,463 B2 * | 3/2008 | Reiter | ...................... | B62M 9/10 474/160 |
| 8,057,338 B2 * | 11/2011 | Kamada | .................... | B62M 9/10 474/152 |
| 8,100,795 B2 * | 1/2012 | Reiter | ...................... | B62M 9/10 474/160 |

(Continued)

FOREIGN PATENT DOCUMENTS

| | | |
|---|---|---|
| TW | M451317 U | 4/2013 |
| TW | 201530021 | 8/2015 |

OTHER PUBLICATIONS

Office Action with Form PTO-892 Notice of References Cited issued by the U.S. Patent and Trademark for U.S. Appl. No. 14/838,247, dated Apr. 17, 2018

(Continued)

*Primary Examiner* — Emmanuel M Marcelo
*Assistant Examiner* — Mark K Buse
(74) *Attorney, Agent, or Firm* — Mori & Ward, LLP

(57) ABSTRACT

A bicycle rear sprocket comprises a sprocket support member, a first attachment portion, and a second attachment portion. The sprocket support member comprises a first support member and a second support member. The first support member includes a first radially outer portion and a first radially inner portion. The second support member includes a second radially outer portion and a second radially inner portion. The first support member faces the second support member in the axial direction to define an axial gap provided between the first support member and the second support member in the axial direction. The first radially outer portion of the first support member is configured to be attached to the second radially outer portion of the second support member via a bicycle sprocket positioned between the first attachment portion and the second attachment portion in the axial direction.

11 Claims, 17 Drawing Sheets

(56) References Cited

U.S. PATENT DOCUMENTS

| | | | | |
|---|---|---|---|---|
| 9,415,835 B2* | 8/2016 | Tokuyama | ............... | B62M 9/12 |
| 9,829,085 B2* | 11/2017 | Iwai | ...................... | F16H 55/303 |
| 2003/0153423 A1* | 8/2003 | Smith | ...................... | B62M 9/10 |
| | | | | 474/160 |
| 2004/0009838 A1* | 1/2004 | Valle | ...................... | B62M 9/105 |
| | | | | 474/160 |
| 2004/0121867 A1* | 6/2004 | Reiter | ...................... | B62M 9/10 |
| | | | | 474/160 |
| 2009/0098966 A1* | 4/2009 | Kamada | ................... | B62M 9/10 |
| | | | | 474/160 |
| 2012/0225745 A1* | 9/2012 | Oishi | ...................... | B62M 9/10 |
| | | | | 474/160 |
| 2014/0335986 A1* | 11/2014 | Iwai | ...................... | B62M 9/105 |
| | | | | 474/155 |
| 2014/0335987 A1* | 11/2014 | Iwai | ......................... | B62M 9/10 |
| | | | | 474/161 |
| 2015/0210352 A1* | 7/2015 | Sugimoto | .............. | B62M 9/105 |
| | | | | 474/80 |
| 2015/0210353 A1* | 7/2015 | Tokuyama | ............... | B62M 9/12 |
| | | | | 474/160 |
| 2019/0276117 A1* | 9/2019 | Tokuyama | ............... | B62M 9/10 |

OTHER PUBLICATIONS

Office Action issued by the U.S. Patent and Trademark Office for U.S. Appl. No. 14/838,247, dated Nov. 16, 2018.
Office Action issued by the U.S. Patent and Trademark Office for U.S. Appl. No. 14/838,247, dated Feb. 13, 2019.
Notice of Allowance issued by the U.S. Patent and Trademark Office for U.S. Appl. No. 14/838,247, dated Apr. 17, 2019.

* cited by examiner

BICYCLE REAR SPROCKET ASSEMBLY AND BICYCLE REAR SPROCKET

CROSS-REFERENCE TO RELATED APPLICATIONS

The present application is a divisional application of the U.S. patent application Ser. No. 14/838,427 filed Aug. 28, 2015. The contents of this application are incorporated herein by reference in their entirety.

BACKGROUND OF THE INVENTION

Field of the Invention

The present invention relates to a bicycle rear sprocket assembly and a bicycle rear sprocket.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle sprocket.

SUMMARY OF THE INVENTION

In accordance with an aspect of the present invention, a bicycle rear sprocket comprises a sprocket support member, a first attachment portion, and a second attachment portion. The sprocket support member is rotatable about a rotational center axis. The sprocket support member has a first axial side and a second axial side opposite to the first axial side in an axial direction parallel to the rotational center axis. The sprocket support member comprises a first support member and a second support member. The first support member includes a first radially outer portion and a first radially inner portion. The first support member at least partly constitutes the first axial side. The second support member includes a second radially outer portion and a second radially inner portion. The second support member at least partly constitutes the second axial side. The first support member faces the second support member in the axial direction to define an axial gap provided between the first support member and the second support member in the axial direction. The first attachment portion is provided at the first radially outer portion of the first support member. The second attachment portion is provided at the second radially outer portion of the second support member. The first radially outer portion of the first support member is configured to be attached to the second radially outer portion of the second support member via a bicycle sprocket positioned between the first attachment portion and the second attachment portion in the axial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
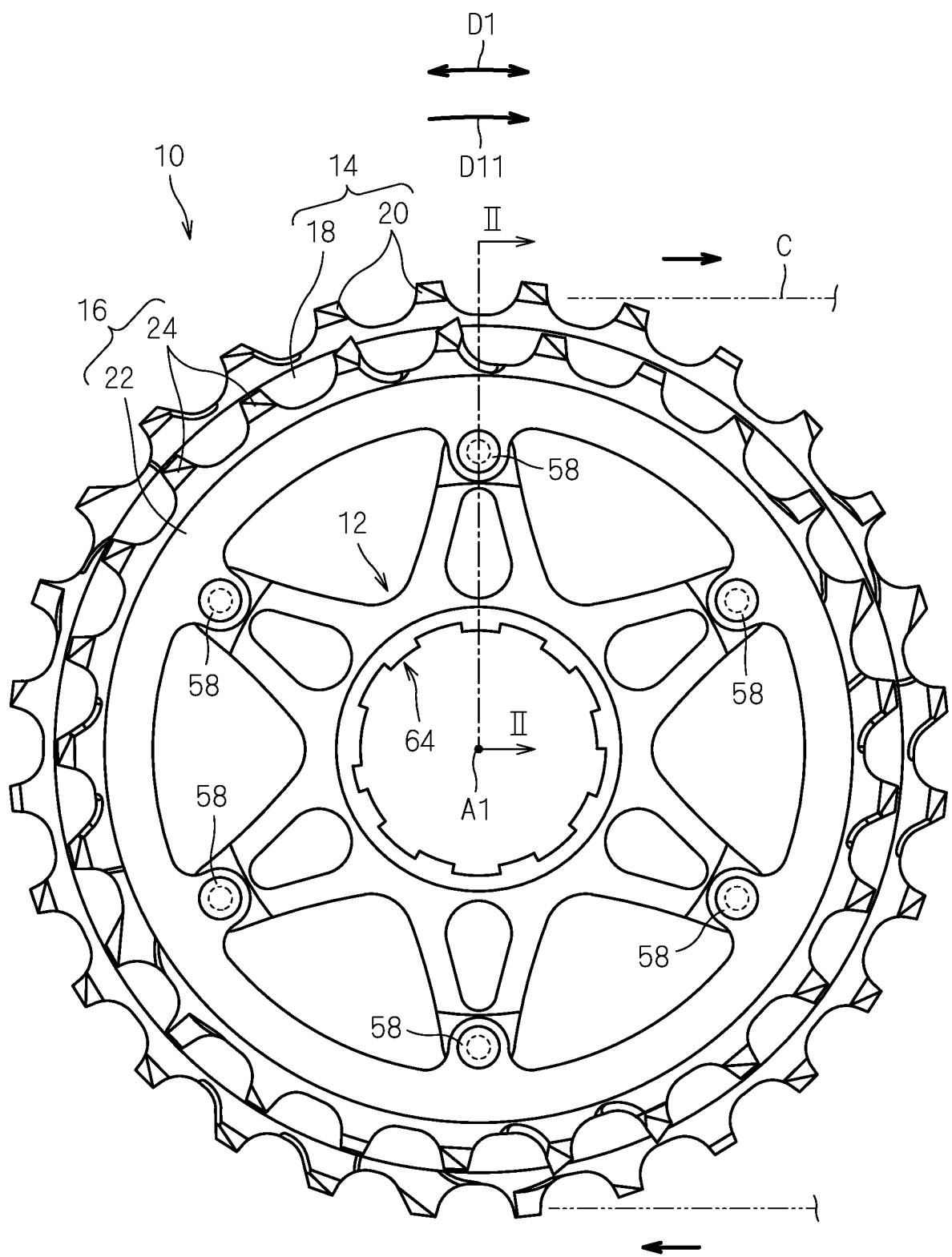
FIG. 1 is a side elevational view of a bicycle rear sprocket assembly in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle rear sprocket assembly 10 in accordance with a first embodiment is configured to be engaged with a bicycle chain C. The bicycle rear sprocket assembly 10 is configured to be rotated about a rotational center axis A1 in a driving rotational direction D11 during pedaling. The driving rotational direction D11 is defined along a circumferential direction D1 of the bicycle rear sprocket assembly 10.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle rear sprocket assembly 10, should be interpreted relative to the bicycle equipped with the bicycle rear sprocket assembly 10 as used in an upright riding position on a horizontal surface.

As seen in FIG. 1, the bicycle rear sprocket assembly 10 comprises a sprocket support member 12. The sprocket support member 12 is rotatable about the rotational center axis A1. The bicycle rear sprocket assembly 10 may further comprise a first sprocket 14 and a second sprocket 16.

The first sprocket 14 comprises a first sprocket body 18 and a plurality of first sprocket teeth 20. The first sprocket body 18 is rotatable about the rotational center axis A1. The first sprocket body 18 has an annular shape. The plurality of first sprocket teeth 20 protrude from an outer periphery of the first sprocket body 18. The plurality of first sprocket teeth 20 are configured to be engaged with the bicycle chain C.

The second sprocket 16 comprises a second sprocket body 22 and a plurality of second sprocket teeth 24. The second sprocket body 22 is rotatable about the rotational center axis A1. The second sprocket body 22 has an annular shape. The plurality of second sprocket teeth 24 protrude from an outer periphery of the second sprocket body 22. The plurality of second sprocket teeth 24 are configured to be engaged with the bicycle chain C.

A total number of the plurality of first sprocket teeth 20 is different from a total number of the plurality of second sprocket teeth 24. In this embodiment, the total number of the plurality of first sprocket teeth 20 is larger than the total number of the plurality of second sprocket teeth 24. However, the total number of the plurality of first sprocket teeth 20 can be smaller than the total number of the plurality of second sprocket teeth 24.

Figure 2:
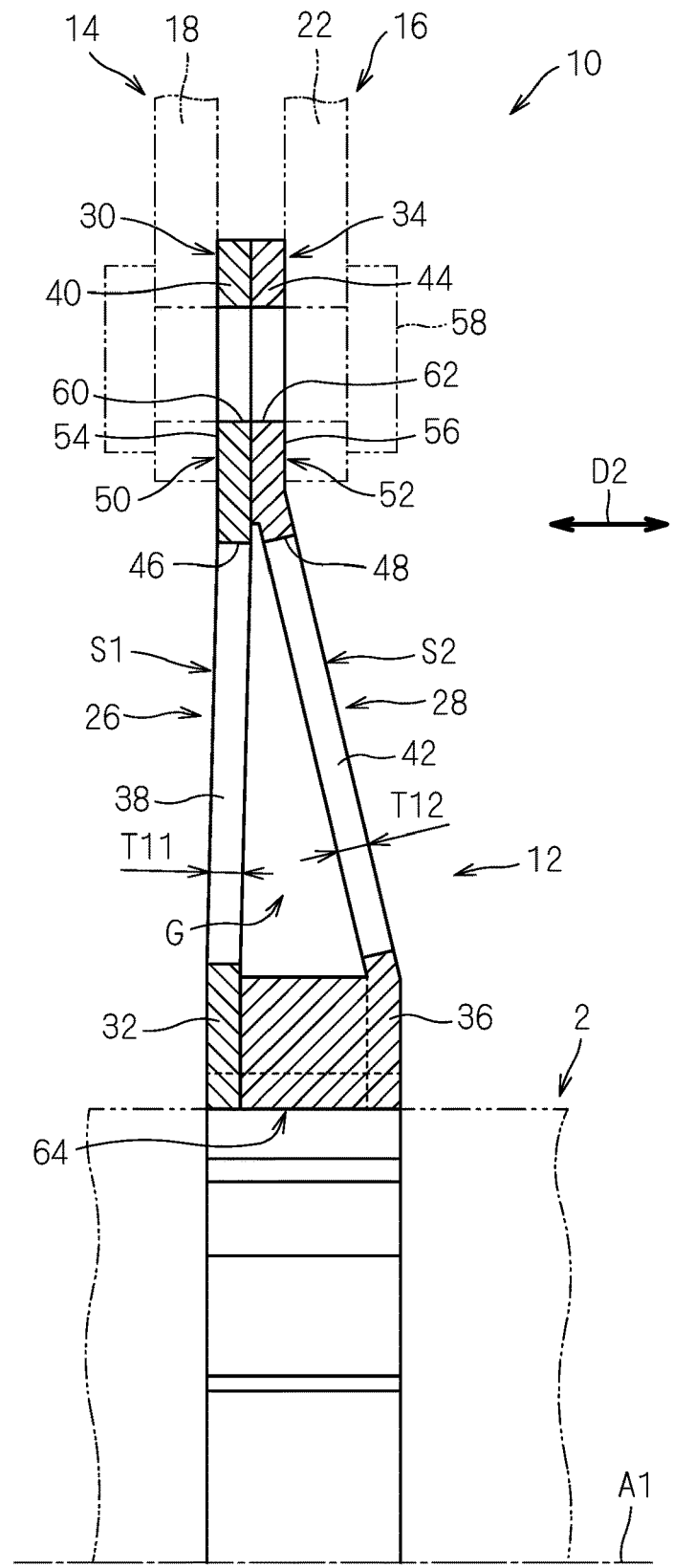
FIG. 2 is a partial cross-sectional view of the bicycle rear sprocket assembly taken along line II-II of FIG. 1.

As seen in FIG. 2, the sprocket support member 12 comprises a first support member 26 and a second support member 28. The first support member 26 includes a first radially outer portion 30 and a first radially inner portion 32. The first radially outer portion 30 is provided radially outward of the first radially inner portion 32. The second support member 28 includes a second radially outer portion 34 and a second radially inner portion 36. The second radially outer portion 34 is provided radially outward of the second radially inner portion 36.

The first radially outer portion 30 is provided at an axial position substantially equal to an axial position of the first radially inner portion 32 in the illustrated embodiment. In contrast, the second radially outer portion 34 is offset from the second radially inner portion 36 in an axial direction D2 parallel to the rotational center axis A1 in the illustrated embodiment. In this embodiment, an axial distance defined between the first radially inner portion 32 and the second radially inner portion 36 in the axial direction D2 is longer than an axial distance defined between the first radially outer portion 30 and the second radially outer portion 34 in the axial direction D2. The first radially outer portion 30 may be offset from the first radially inner portion 32 in an axial direction D2 parallel to the rotational center axis A1 whereas the second radially outer portion 34 may be provided at an axial position substantially equal to an axial position of the second radially inner portion 36. Further, both of the first radially outer portion 30 and the second radially outer portion 34 may be offset from the first radially inner portion 32 and the second radially inner portion 36 respectively in an axial direction D2 parallel to the rotational center axis A1.

The first radially outer portion 30 of the first support member 26 is configured to be attached to the second radially outer portion 34 of the second support member 28. The first support member 26 includes one of a metallic material and a non-metallic material. The second support member 28 includes one of a metallic material and a non-metallic material. In this embodiment, the first support member 26 includes the metallic material. The second support member 28 includes the metallic material. Examples of the metallic material include iron, stainless steel, titanium, and aluminum. The first radially outer portion 30 is configured to be attached to the second radially outer portion 34 via one of adhesive, diffusion bonding, and caulking. In this embodiment, the first radially outer portion 30 is configured to be attached to the second radially outer portion 34 via diffusion bonding. The first radially outer portion 30 is in contact with the second radially outer portion 34.

As seen in FIG. 2, the sprocket support member 12 has a first axial side S1 and a second axial side S2 opposite to the first axial side S1 in the axial direction D2 parallel to the rotational center axis A1. The first support member 26 at least partly constitutes the first axial side S1. The second support member 28 at least partly constitutes the second axial side S2. In this embodiment, the first support member 26 entirely constitutes the first axial side S1. The second support member 28 entirely constitutes the second axial side S2. However, the first support member 26 can partly constitute the first axial side S1. The second support member 28 can partly constitute the second axial side S2.

The first support member 26 faces the second support member 28 in the axial direction D2 to define an axial gap G provided between the first support member 26 and the second support member 28 in the axial direction D2.

Figure 3:
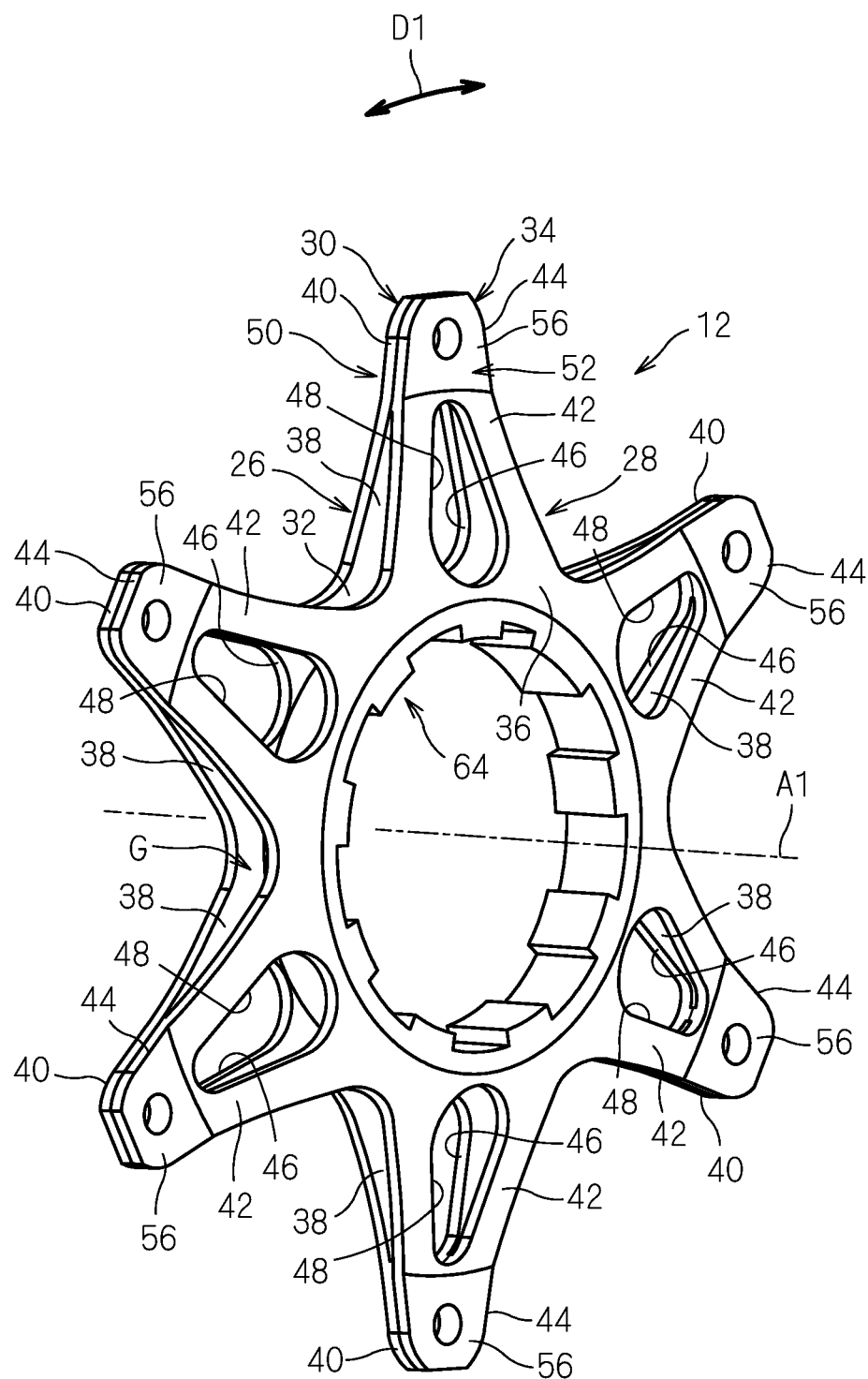
FIG. 3 is a perspective view of a sprocket support member of the bicycle rear sprocket assembly.

As seen in FIG. 3, the first support member 26 includes a plurality of first arms 38 extending between the first radially outer portion 30 and the first radially inner portion 32. The first arms 38 are arranged in the circumferential direction D1 relative to the rotational center axis A1 and are spaced apart from each other in the circumferential direction D1. In this embodiment, the first radially outer portion 30 includes first radially outer parts 40. The first arms 38 respectively extend between the first radially outer parts 40 and the first radially inner portion 32.

As seen in FIG. 3, the second support member 28 includes a plurality of second arms 42 extending between the second radially outer portion 34 and the second radially inner portion 36. The second arms 42 are arranged in the circumferential direction D1 relative to the rotational center axis A1 and are spaced apart from each other in the circumferential direction D1. In this embodiment, the second radially outer portion 34 includes second radially outer parts 44. The second arms 42 respectively extends between the second radially outer parts 44 and the second radially inner portion 36.

As seen in FIG. 3, at least one of the first arms 38 includes a first opening 46 provided between the first radially outer portion 30 and the first radially inner portion 32. In this embodiment, each of the first arms 38 includes the first opening 46 provided between the first radially outer portion 30 and the first radially inner portion 32.

At least one of the second arms 42 includes a second opening 48 provided between the second radially outer portion 34 and the second radially inner portion 36. In this embodiment, each of the second arms 42 includes the second opening 48 provided between the second radially outer portion 34 and the second radially inner portion 36.

As seen in FIG. 2, the first arms 38 respectively face the second arms 42 in the axial direction D2 to define the axial gap G. The first openings 46 respectively face the second openings 48 in the axial direction D2 in the illustrated embodiment. The first openings 46 may respectively be offset from the second openings 48. The first opening 46 and the second opening 48 are in communication with the axial gap G.

The first support member 26 has a first thickness T11. The second support member 28 has a second thickness T12. In this embodiment, the second thickness T12 is substantially equal to the first thickness T11. In this embodiment, the first arms 38 have the first thickness T11. The second arms 42 have the second thickness T12.

As seen in FIG. 2, the bicycle rear sprocket assembly 10 comprises a first sprocket attachment portion 50 and a second sprocket attachment portion 52. The first sprocket 14 is configured to be attached to the first sprocket attachment portion 50. The second sprocket 16 is configured to be attached to the second sprocket attachment portion 52. The first sprocket attachment portion 50 is provided at the first axial side S1. The second sprocket attachment portion 52 is provided at the second axial side S2.

Figure 4:
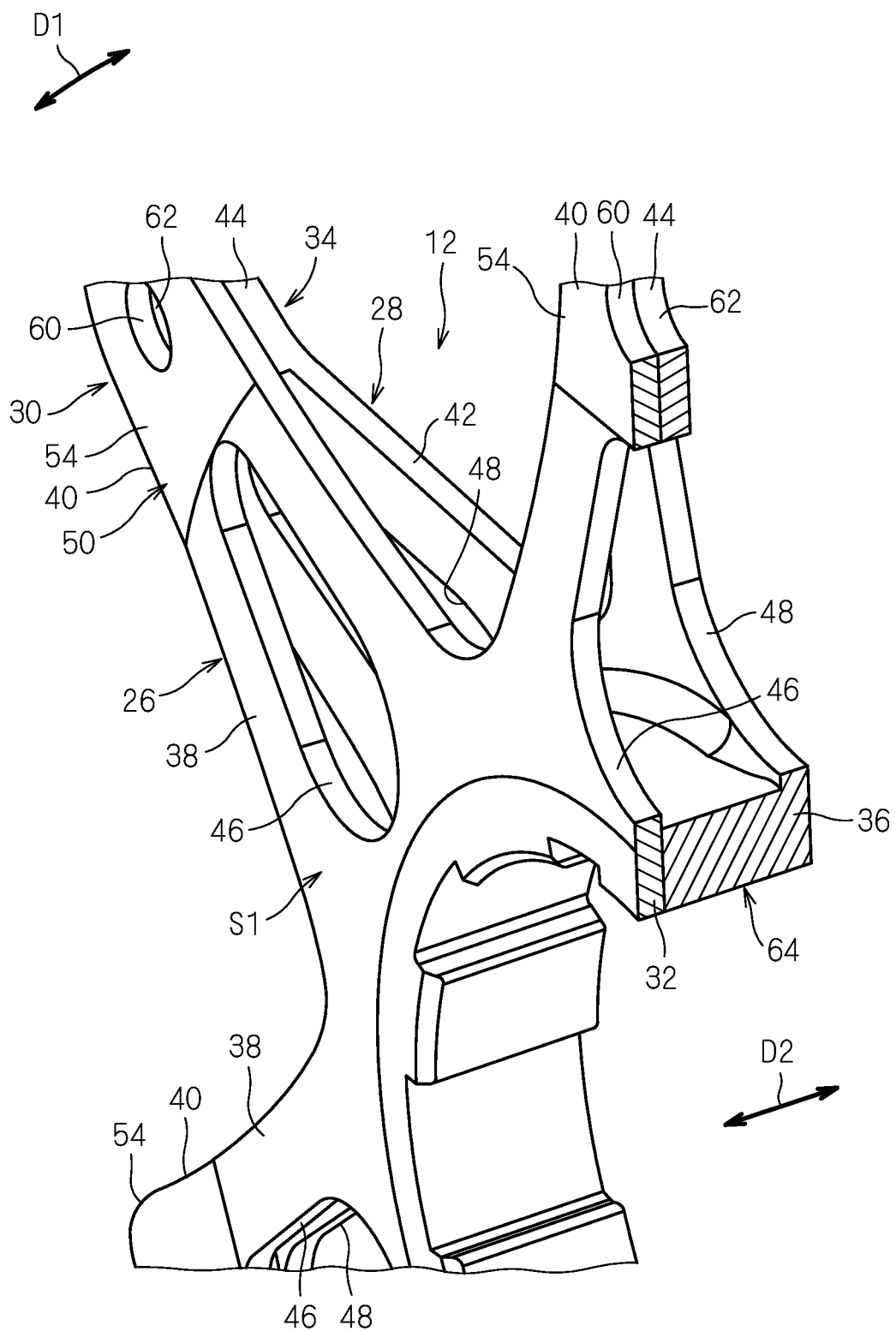
FIG. 4 is a partial perspective cross-sectional view of the sprocket support member.

In this embodiment, as seen in FIG. 4, the first sprocket attachment portion 50 includes first attachment surfaces 54 arranged in the circumferential direction D1. The first attachment surfaces 54 are spaced apart from each other in the circumferential direction D1. The first attachment surfaces 54 are respectively provided at the first radially outer parts 40. As seen in FIG. 2, the first attachment surfaces 54 are provided on the first axial side S1. The first attachment surfaces 54 are in contact with the first sprocket 14 in a state where the first sprocket 14 is attached to the first sprocket attachment portion 50.

Similarly, as seen in FIG. 3, the second sprocket attachment portion 52 includes second attachment surfaces 56 arranged in the circumferential direction D1. The second attachment surfaces 56 are spaced apart from each other in the circumferential direction D1. The second attachment surfaces 56 are respectively provided at the second radially outer parts 44. As seen in FIG. 2, the second attachment surfaces 56 are provided on the second axial side S2. The second attachment surfaces 56 are in contact with the second sprocket 16 in a state where the second sprocket 16 is attached to the second sprocket attachment portion 52.

As seen in FIG. 2, the first sprocket 14 is configured to be attached to the first sprocket attachment portion 50 via one of caulking, adhesive, integral molding, and diffusion bonding. In this embodiment, the first sprocket 14 is configured to be attached to the first sprocket attachment portion 50 via caulking. In a case where the first sprocket 14 is attached to the first sprocket attachment portion 50 via caulking, the first sprocket 14 is fixedly engaged with the first sprocket attachment portion 50 by deforming at least one of the first sprocket 14, the first sprocket attachment portion 50, and other parts when the bicycle rear sprocket assembly 10 is manufactured. Specifically, the first sprocket 14 is attached to the first sprocket attachment portion 50 via rivets 58.

The second sprocket 16 is configured to be attached to the second sprocket attachment portion 52 via one of caulking, adhesive, integral molding, and diffusion bonding. In this embodiment, the second sprocket 16 is configured to be attached to the second sprocket attachment portion 52 via caulking. In a case where the second sprocket 16 is attached to the second sprocket attachment portion 52 via caulking, the second sprocket 16 is fixedly engaged with the second sprocket attachment portion 52 by deforming at least one of the second sprocket 16, the second sprocket attachment portion 52, and other parts when the bicycle rear sprocket assembly 10 is manufactured. Specifically, the second sprocket 16 is attached to the second sprocket attachment portion 52 via the rivets 58.

Each of the first radially outer parts 40 includes a first attachment hole 60. Each of the second radially outer parts 44 includes a second attachment hole 62. The rivet 58 extends through the first attachment hole 60 and the second attachment hole 62.

As seen in FIGS. 2 and 4, the bicycle rear sprocket assembly 10 further comprises a hub engagement portion 64 with which a bicycle hub assembly 2 is to be engaged. The hub engagement portion 64 is provided integrally with at least one of the first radially inner portion 32 of the first support member 26 and the second radially inner portion 36 of the second support member 28 as a single unitary member. The hub engagement portion 64 is a separate member from at least one of the first radially inner portion 32 of the first support member 26 and the second radially inner portion 36 of the second support member 28.

In this embodiment, the hub engagement portion 64 is provided integrally with the second radially inner portion 36 of the second support member 28 as a single unitary member e.g. by burring, cutting, casting and so on. The hub engagement portion 64 is a separate member from the first radially inner portion 32 of the first support member 26. The hub engagement portion 64 includes one of a metallic material and a non-metallic material. In this embodiment, the hub engagement portion 64 includes the metallic material. However, the hub engagement portion 64 can include a resin material. Examples of the metallic material include iron, stainless steel, titanium, and aluminum.

As seen in FIGS. 2 and 4, the first radially inner portion 32 is configured to be attached to the second radially inner portion 36 via the hub engagement portion 64. The hub engagement portion 64 is provided between the first radially inner portion 32 and the second radially inner portion 36. The hub engagement portion 64 is configured to be attached to the first radially inner portion 32 of the first support member 26 via one of caulking, adhesive, integral molding, and diffusion bonding. In this embodiment, the hub engagement portion 64 is configured to be attached to the first radially inner portion 32 of the first support member 26 via diffusion bonding. The hub engagement portion 64 is in contact with the first radially inner portion 32.

In this embodiment, as seen in FIGS. 2 and 4, each of the first radially inner portion 32 and the second radially inner portion 36 includes a splined part having a shape substantially identical to a shape of a splined part of the hub engagement portion 64. However, at least one of the first radially inner portion 32 and the second radially inner portion 36 can have a shape different from the shape of the hub engagement portion 64.

With the bicycle rear sprocket assembly 10, the first support member 26 faces the second support member 28 in the axial direction D2 to define the axial gap G provided between the first support member 26 and the second support member 28 in the axial direction D2. Accordingly, it is possible to save weight of the bicycle rear sprocket assembly 10 with maintaining the desired strength of the bicycle rear sprocket assembly 10.

Second Embodiment

A bicycle rear sprocket assembly 210 in accordance with a second embodiment will be described below referring to FIG. 5. The bicycle rear sprocket assembly 210 has the same configuration as the bicycle rear sprocket assembly 10 except for the second support member 28. Elements having substantially the same function as those in the first embodiment will be numbered the same here, and will not be described again in detail here for the sake of brevity.

Figure 5:
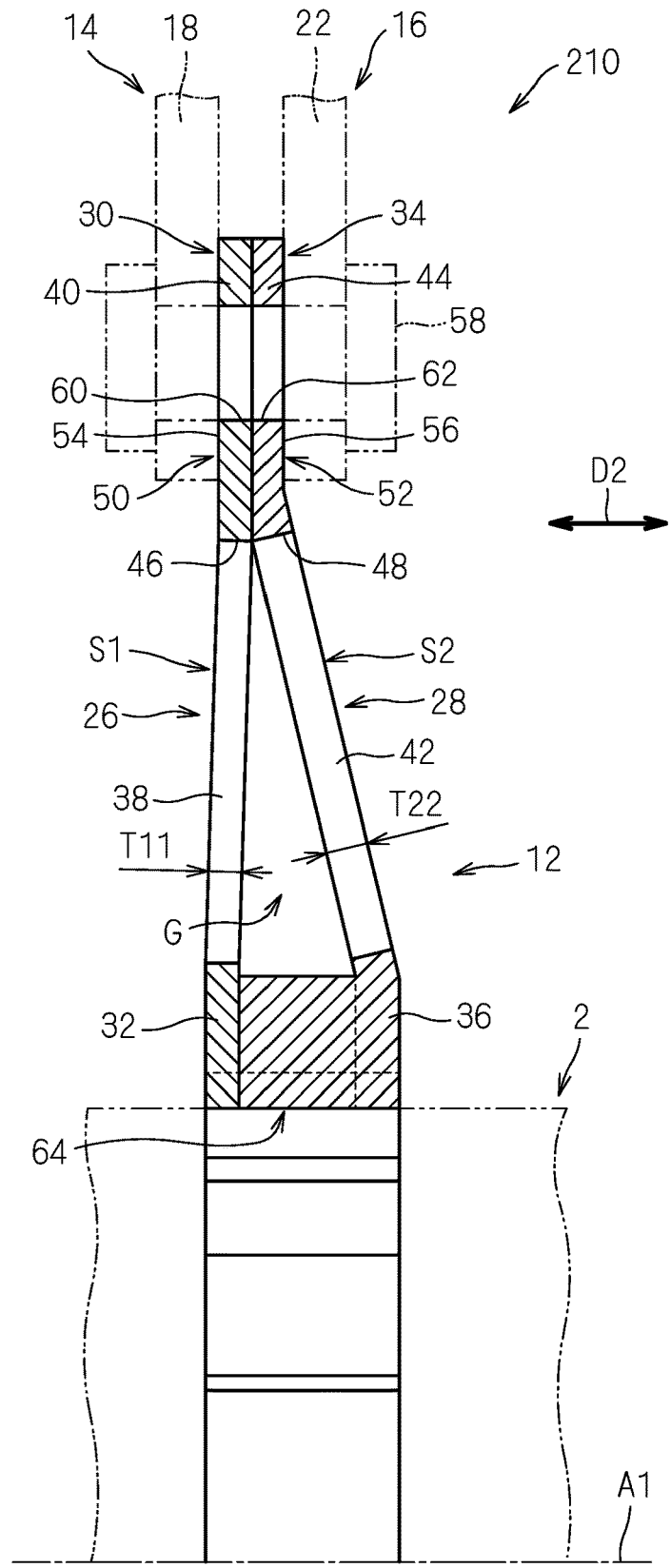
FIG. 5 is a partial cross-sectional view of a bicycle rear sprocket assembly in accordance with a second embodiment.

As seen in FIG. 5, in the bicycle rear sprocket assembly 210, the second support member 28 has a second thickness T22 different from the first thickness T11. In this embodiment, the second thickness T22 is larger than the first thickness T11. However, the second thickness T22 can be smaller than the first thickness T11.

With the bicycle rear sprocket assembly 210, it is possible to obtain the same effects as those of the bicycle rear sprocket assembly 10 in accordance with the first embodiment.

Third Embodiment

A bicycle rear sprocket assembly 310 in accordance with a third embodiment will be described below referring to FIG. 6. The bicycle rear sprocket assembly 310 has the same configuration as the bicycle rear sprocket assembly 10 except for the hub engagement portion 64. Elements having substantially the same function as those in the above embodiments will be numbered the same here, and will not be described again in detail here for the sake of brevity.

Figure 6:
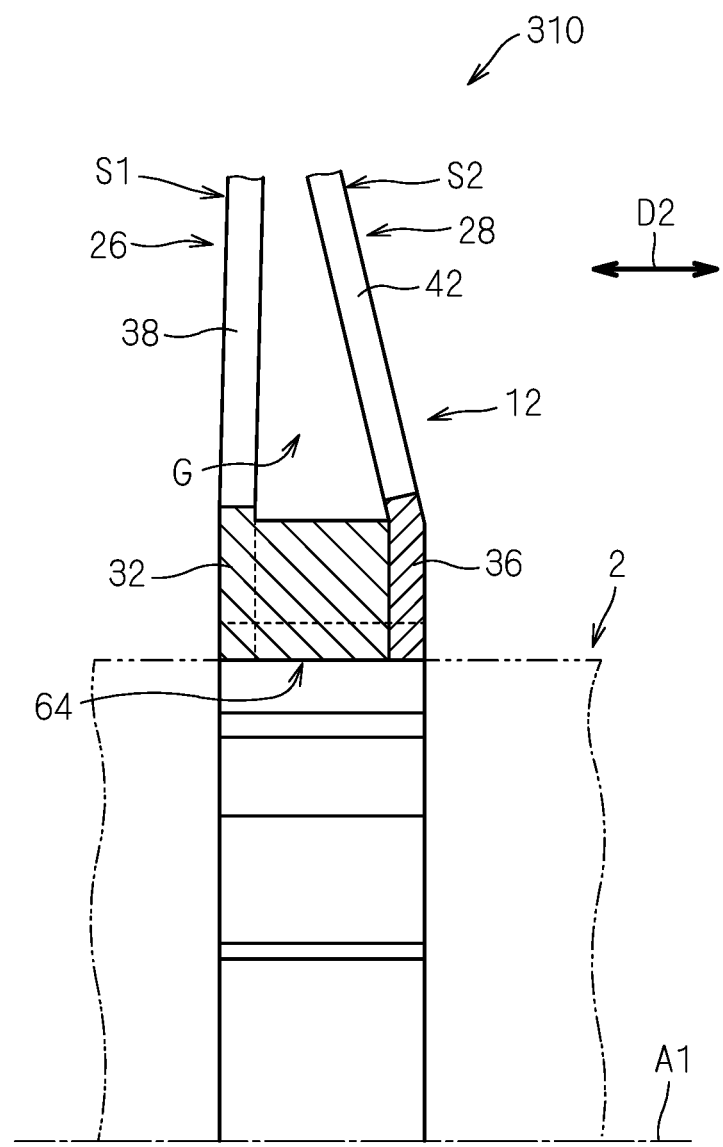
FIG. 6 is a partial cross-sectional view of a bicycle rear sprocket assembly in accordance with a third embodiment.

As seen in FIG. 6, in the bicycle rear sprocket assembly 310, the hub engagement portion 64 is provided integrally with the first radially inner portion 32 of the first support member 26 as a single unitary member e.g. by burring, cutting, casting and so on. The hub engagement portion 64 is a separate member from the second radially inner portion 36 of the second support member 28. The hub engagement portion 64 is configured to be attached to the second radially inner portion 36 via one of adhesive, diffusion bonding, and caulking. In this embodiment, the hub engagement portion 64 is configured to be attached to the second radially inner portion 36 via diffusion bonding.

With the bicycle rear sprocket assembly 310, it is possible to obtain the same effects as those of the bicycle rear sprocket assembly 10 in accordance with the first embodiment.

Fourth Embodiment

A bicycle rear sprocket assembly 410 in accordance with a fourth embodiment will be described below referring to FIG. 7. The bicycle rear sprocket assembly 410 has the same configuration as the bicycle rear sprocket assembly 10 except for the hub engagement portion 64. Elements having substantially the same function as those in the above embodiments will be numbered the same here, and will not be described again in detail here for the sake of brevity.

Figure 7:
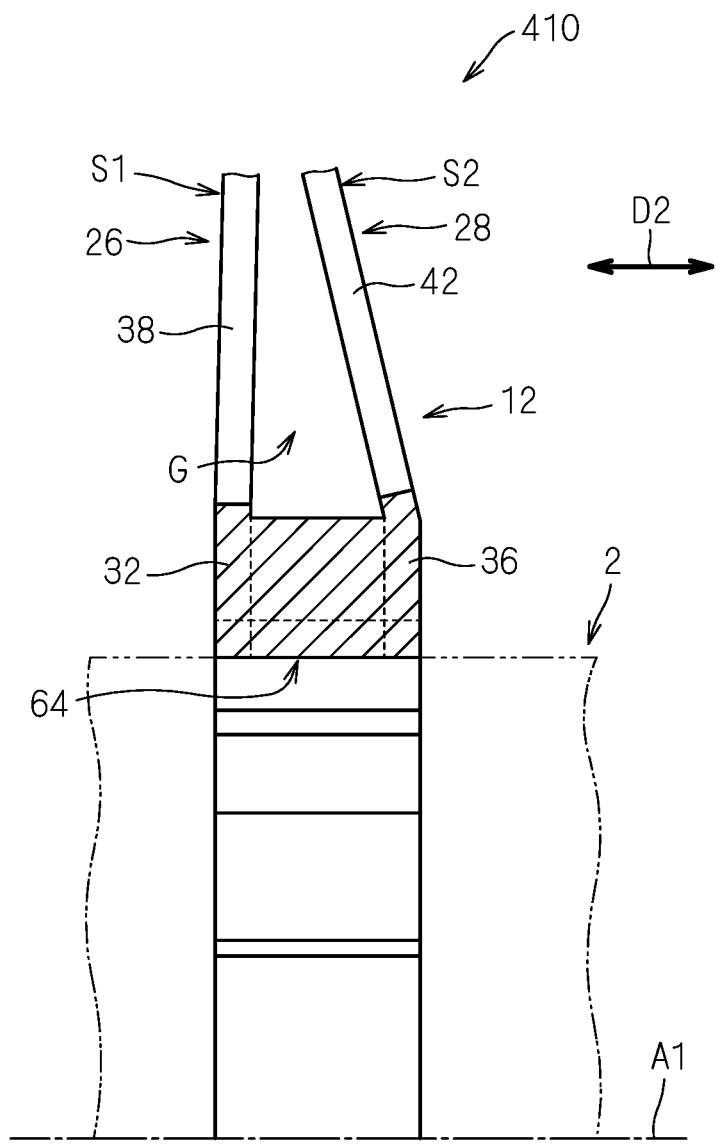
FIG. 7 is a partial cross-sectional view of a bicycle rear sprocket assembly in accordance with a fourth embodiment.

As seen in FIG. 7, in the bicycle rear sprocket assembly 410, the hub engagement portion 64 is provided integrally with the first radially inner portion 32 and the second radially inner portion 36 as a single unitary member. Each of the first support member 26, the second support member 28, and the hub engagement portion 64 includes one of a metallic material and a non-metallic material. For example, each of the first support member 26, the second support member 28, and the hub engagement portion 64 includes the non-metallic material. Each of the first support member 26, the second support member 28, and the hub engagement portion 64 includes a resin material. The first support member 26, the second support member 28, and the hub engagement portion 64 are integrally formed via integral molding, for example. Each of the first support member 26, the second support member 28, and the hub engagement portion 64 can include the metallic material.

With the bicycle rear sprocket assembly 410, it is possible to obtain the same effects as those of the bicycle rear sprocket assembly 10 in accordance with the first embodiment.

Fifth Embodiment

A bicycle rear sprocket assembly 510 in accordance with a fifth embodiment will be described below referring to FIG. 8. The bicycle rear sprocket assembly 510 has the same configuration as the bicycle rear sprocket assembly 10 except for the hub engagement portion 64. Elements having substantially the same function as those in the above embodiments will be numbered the same here, and will not be described again in detail here for the sake of brevity.

Figure 8:
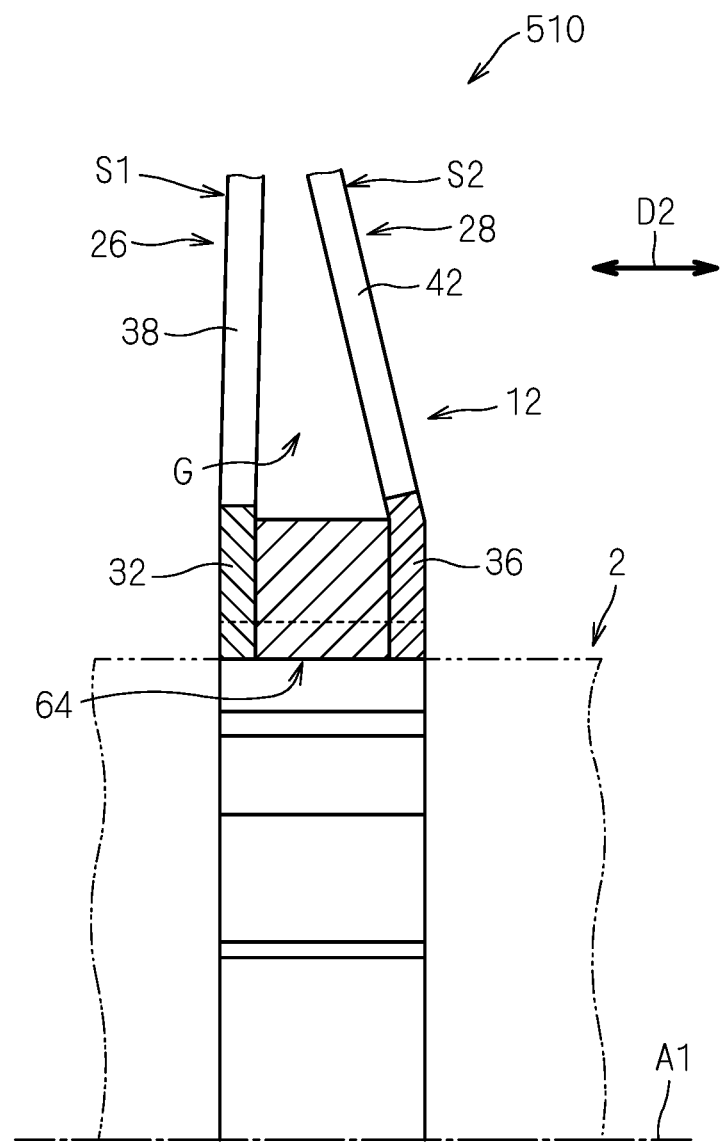
FIG. 8 is a partial cross-sectional view of a bicycle rear sprocket assembly in accordance with a fifth embodiment.

As seen in FIG. 8, in the bicycle rear sprocket assembly 510, the hub engagement portion 64 is a separate member from the first radially inner portion 32 of the first support member 26 and the second radially inner portion 36 of the second support member 28. The first radially inner portion 32 is configured to be attached to the second radially inner portion 36 via the hub engagement portion 64. The hub engagement portion 64 is configured to be attached to the first radially inner portion 32 and the second radially inner portion 36 via one of caulking, adhesive, integral molding, and diffusion bonding. In this embodiment, the hub engagement portion 64 is configured to be attached to the first radially inner portion 32 and the second radially inner portion 36 via diffusion bonding.

With the bicycle rear sprocket assembly 510, it is possible to obtain the same effects as those of the bicycle rear sprocket assembly 10 in accordance with the first embodiment.

Sixth Embodiment

A bicycle rear sprocket assembly 610 in accordance with a sixth embodiment will be described below referring to FIG. 9. The bicycle rear sprocket assembly 610 has the same configuration as the bicycle rear sprocket assembly 10 except for the hub engagement portion 64. Elements having substantially the same function as those in the above embodiments will be numbered the same here, and will not be described again in detail here for the sake of brevity.

Figure 9:
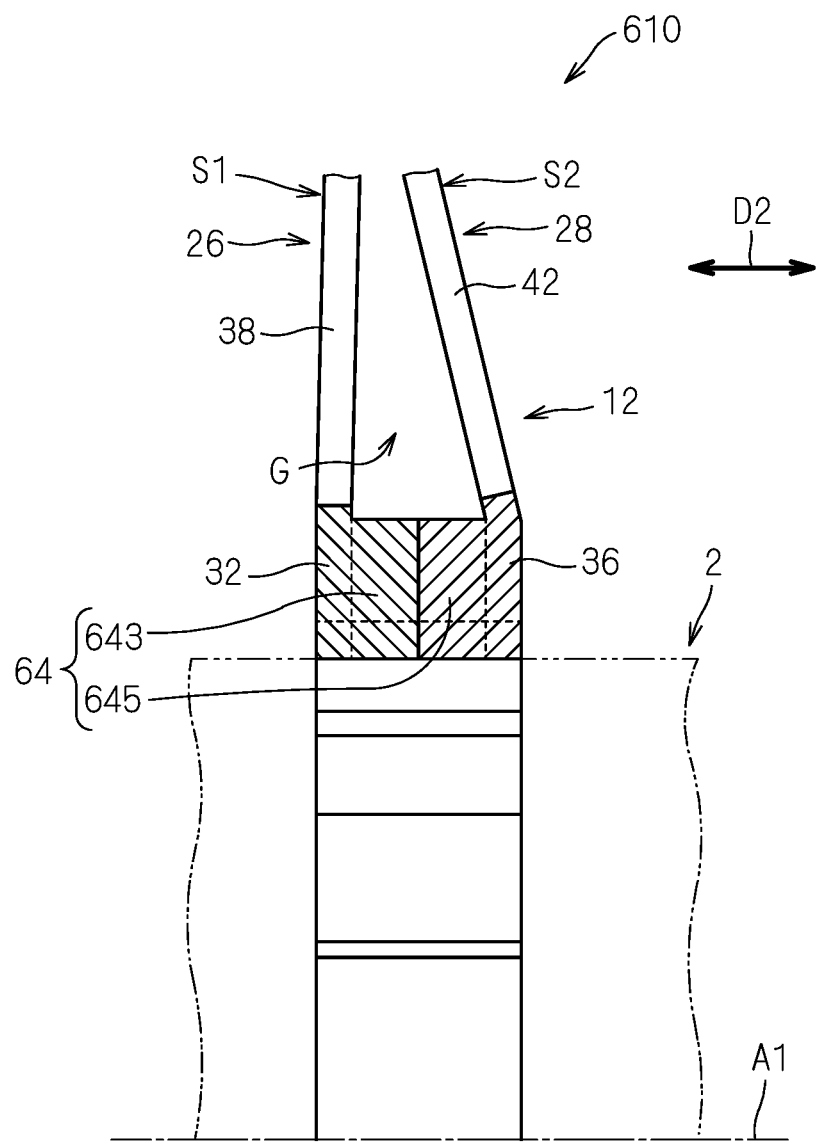
FIG. 9 is a partial cross-sectional view of a bicycle rear sprocket assembly in accordance with a sixth embodiment.

As seen in FIG. 9, in the bicycle rear sprocket assembly 610, the hub engagement portion 64 includes a first hub engagement portion 643 and a second hub engagement portion 645. The first hub engagement portion 643 is a separate member from the second hub engagement portion 645 and is provided integrally with the first radially inner portion 32 of the first support member 26 as a single unitary member e.g. by burring, cutting, casting and so on. The second hub engagement portion 645 is a separate member from the first hub engagement portion 643 and is provided integrally with the second radially inner portion 36 of the second support member 28 as a single unitary member e.g. by burring, cutting, casting and so on.

The first hub engagement portion 643 includes one of a metallic material and a non-metallic material. The second hub engagement portion 645 includes one of a metallic material and a non-metallic material. In this embodiment, each of the first hub engagement portion 643 and the second hub engagement portion 645 includes the metallic material. The first hub engagement portion 643 is configured to be attached to the second hub engagement portion 645 via one of caulking, adhesive, integral molding, and diffusion bonding. In this embodiment, the first hub engagement portion 643 is configured to be attached to the second hub engagement portion 645 via diffusion bonding.

With the bicycle rear sprocket assembly 610, it is possible to obtain the same effects as those of the bicycle rear sprocket assembly 10 in accordance with the first embodiment.

Seventh Embodiment

A bicycle rear sprocket assembly 710 in accordance with a seventh embodiment will be described below referring to FIG. 10. The bicycle rear sprocket assembly 710 has the same configuration as the bicycle rear sprocket assembly 10 except for the first support member 26, the second support member 28, and the hub engagement portion 64. Elements having substantially the same function as those in the above embodiments will be numbered the same here, and will not be described again in detail here for the sake of brevity.

Figure 10:
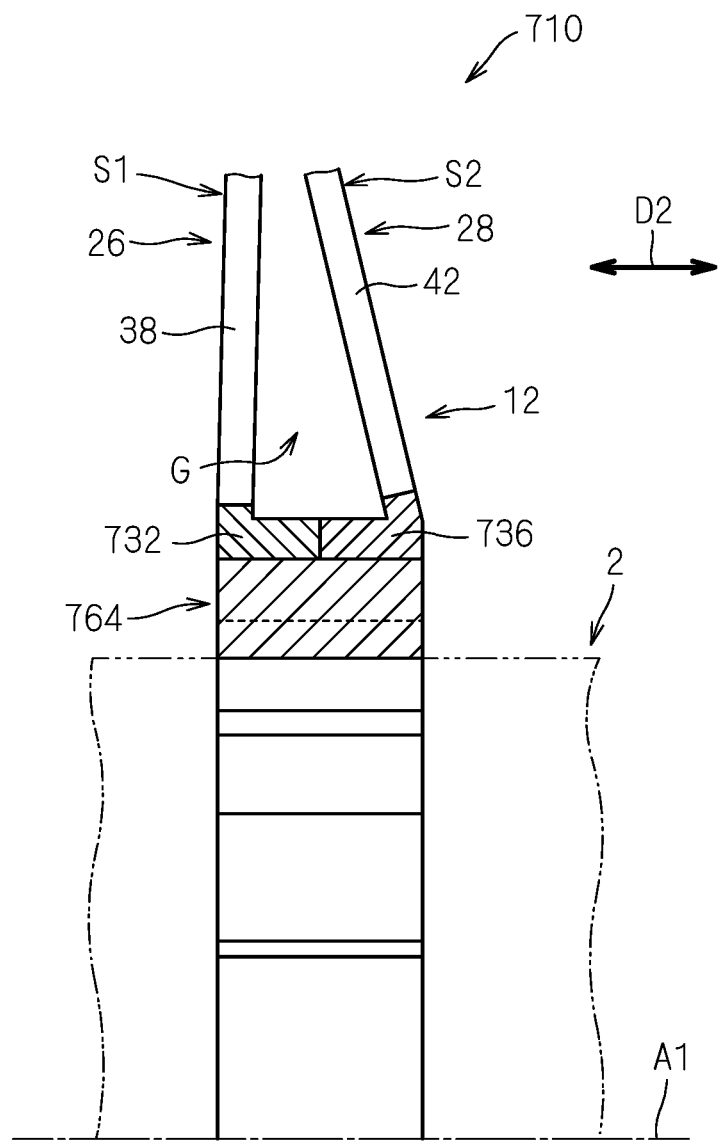
FIG. 10 is a partial cross-sectional view of a bicycle rear sprocket assembly in accordance with a seventh embodiment.

As seen in FIG. 10, in the bicycle rear sprocket assembly 710, the first support member 26 includes a first radially inner portion 732. The second support member 28 includes a second radially inner portion 736. The first radially inner portion 732 is configured to be directly attached to the second radially inner portion 736. In this embodiment, the first radially inner portion 732 extends in the axial direction D2 toward the second radially inner portion 736. The second radially inner portion 736 extends in the axial direction D2 toward the first radially inner portion 732. An axial end of the first radially inner portion 732 is attached to an axial end of the second radially inner portion 736.

The first radially inner portion 732 is configured to be attached to the second radially inner portion 736 via one of adhesive, diffusion bonding, and caulking. In this embodiment, the first radially inner portion 732 is configured to be attached to the second radially inner portion 736 via adhesive.

The bicycle rear sprocket assembly 710 comprises a hub engagement portion 764 with which the bicycle hub assembly 2 is to be engaged. The hub engagement portion 764 has substantially the same structure as that of the hub engagement portion 64 in the first embodiment. However, the hub engagement portion 764 is a separate member from the first radially inner portion 732 of the first support member 26 and the second radially inner portion 736 of the second support member 28. The hub engagement portion 764 is configured to be attached to the first radially inner portion 732 and the second radially inner portion 736. The hub engagement portion 764 is configured to be attached to the first radially inner portion 732 and the second radially inner portion 736 via one of adhesive, diffusion bonding, and caulking. In this embodiment, the hub engagement portion 764 is configured to be attached to the first radially inner portion 732 and the second radially inner portion 736 via adhesive. The hub engagement portion 764 is provided radially inward of the first radially inner portion 732 and the second radially inner portion 736.

With the bicycle rear sprocket assembly 710, it is possible to obtain the same effects as those of the bicycle rear sprocket assembly 10 in accordance with the first embodiment.

Eighth Embodiment

A bicycle rear sprocket assembly 810 in accordance with an eighth embodiment will be described below referring to FIG. 11. The bicycle rear sprocket assembly 810 has the same configuration as the bicycle rear sprocket assembly 10 except for the first support member 26 and the second support member 28. Elements having substantially the same function as those in the above embodiments will be numbered the same here, and will not be described again in detail here for the sake of brevity.

Figure 11:
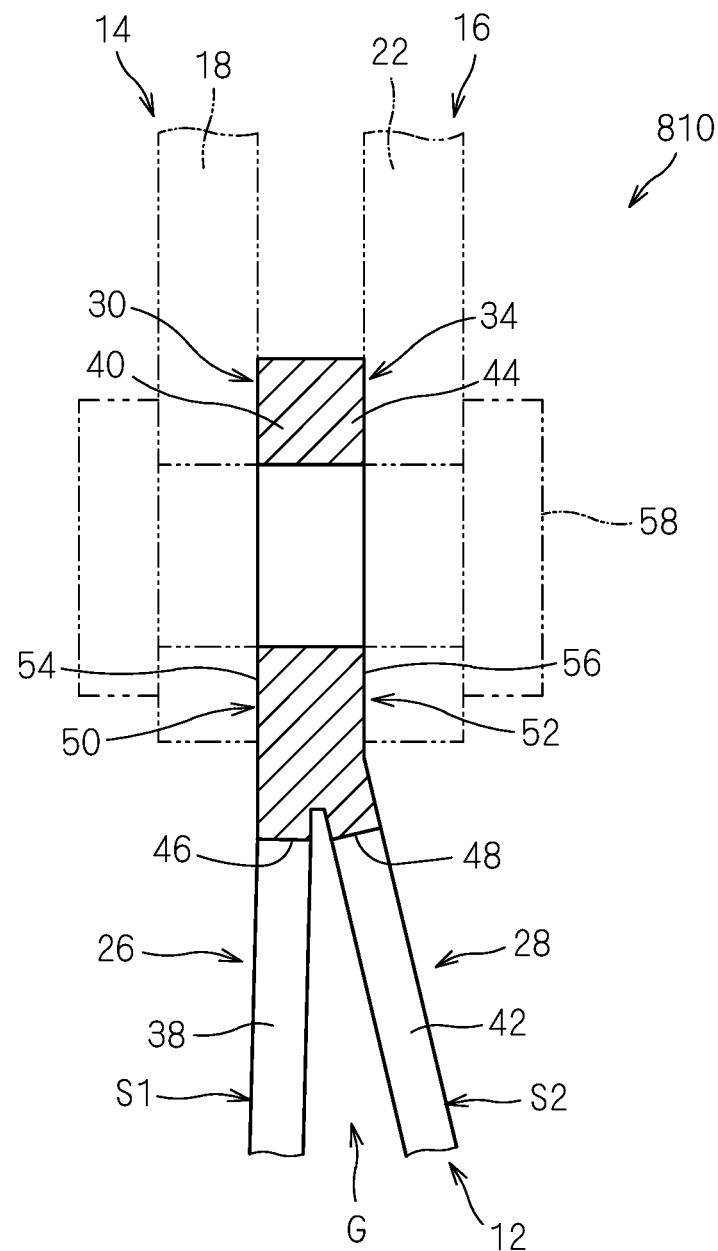
FIG. 11 is a partial cross-sectional view of a bicycle rear sprocket assembly in accordance with an eighth embodiment.

As seen in FIG. 11, in the bicycle rear sprocket assembly 810, the first radially outer portion 30 of the first support member 26 is provided integrally with the second radially outer portion 34 of the second support member 28 as a single unitary member. Specifically, the first radially outer parts 40 are respectively provided integrally with the second radially outer parts 44 as a single unitary member. For example, the first support member 26 and the second support member 28 include a non-metallic material such as a resin material. The first support member 26 and the second support member 28 are formed integrally with each other via integral molding, for example. Further, the first support member 26 and the second support member 28 may include a metallic material. The first support member 26 and the second support member 28 are formed integrally with each other via cutting or casting, for example.

With the bicycle rear sprocket assembly 810, it is possible to obtain the same effects as those of the bicycle rear sprocket assembly 10 in accordance with the first embodiment.

Ninth Embodiment

A bicycle rear sprocket assembly 910 in accordance with a ninth embodiment will be described below referring to FIG. 12. The bicycle rear sprocket assembly 910 has the same configuration as the bicycle rear sprocket assembly 10 except for the first support member 26 and the second support member 28. Elements having substantially the same function as those in the above embodiments will be numbered the same here, and will not be described again in detail here for the sake of brevity.

Figure 12:
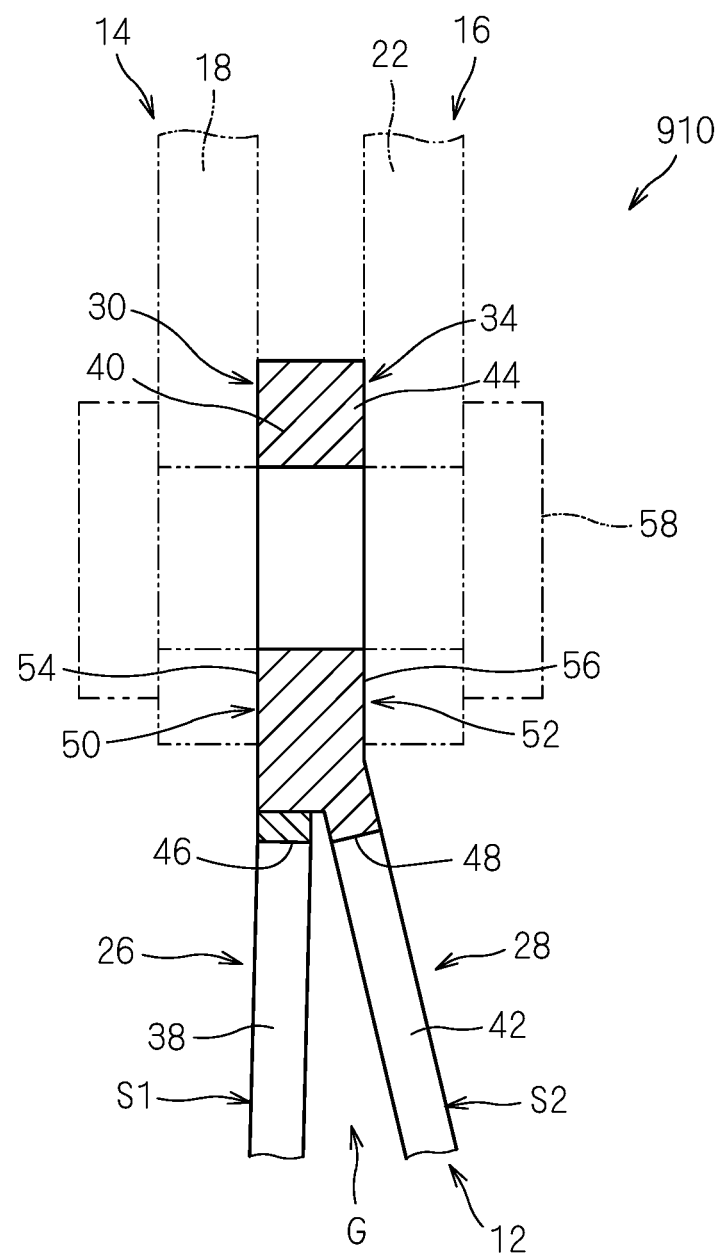
FIG. 12 is a partial cross-sectional view of a bicycle rear sprocket assembly in accordance with a ninth embodiment.

As seen in FIG. 12, in the bicycle rear sprocket assembly 910, the first radially outer portion 30 of the first support member 26 is provided integrally with the second radially outer portion 34 of the second support member 28 as a single unitary member. Specifically, the first radially outer parts 40 are respectively provided integrally with the second radially outer parts 44 as a single unitary member.

However, the first radially outer portion 30 is a separate member from the first arms 38. The first radially outer parts 40 respectively are separate members from the first arms 38. The first radially outer parts 40 are attached to the first arms 38 via one of adhesive, diffusion bonding, and caulking. For example, the first radially outer portion 30 and the first arms 38 include a metallic material. The first radially outer portion 30 (the first radially outer parts 40) is attached to the first arms 38 via diffusion bonding.

With the bicycle rear sprocket assembly 910, it is possible to obtain the same effects as those of the bicycle rear sprocket assembly 10 in accordance with the first embodiment.

Tenth Embodiment

A bicycle rear sprocket assembly 1010 in accordance with a tenth embodiment will be described below referring to FIG. 13. The bicycle rear sprocket assembly 1010 has the same configuration as the bicycle rear sprocket assembly 10 except for the first support member 26 and the second support member 28. Elements having substantially the same function as those in the above embodiments will be numbered the same here, and will not be described again in detail here for the sake of brevity.

Figure 13:
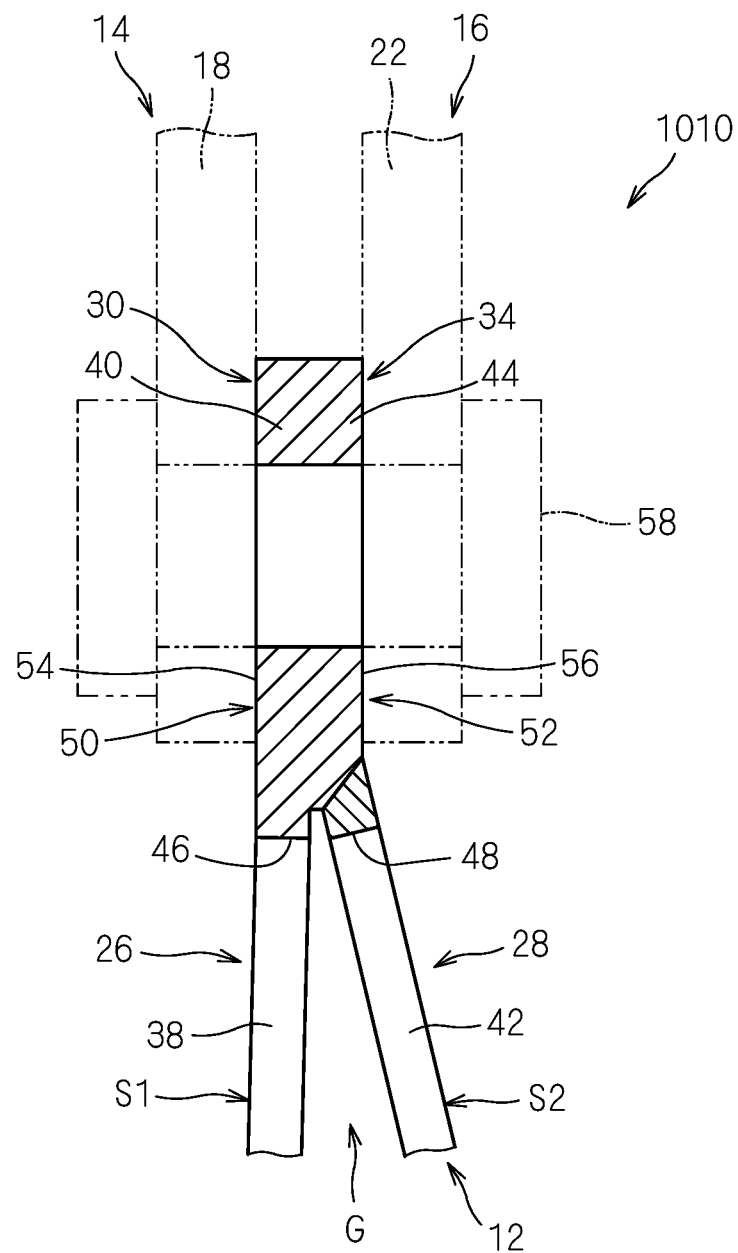
FIG. 13 is a partial cross-sectional view of a bicycle rear sprocket assembly in accordance with a tenth embodiment.

As seen in FIG. 13, in the bicycle rear sprocket assembly 1010, the first radially outer portion 30 of the first support member 26 is provided integrally with the second radially outer portion 34 of the second support member 28 as a single unitary member. Specifically, the first radially outer parts 40 are respectively provided integrally with the second radially outer parts 44 as a single unitary member.

However, the second radially outer portion 34 is a separate member from the second arms 42. The second radially outer parts 44 respectively are separate members from the second arms 42. The second radially outer parts 44 are attached to the second arms 42 via one of adhesive, diffusion bonding, and caulking. For example, the second radially outer portion 34 and the second arms 42 include a metallic material. The second radially outer portion 34 (the second radially outer parts 44) is attached to the second arms 42 via diffusion bonding.

With the bicycle rear sprocket assembly 1010, it is possible to obtain the same effects as those of the bicycle rear sprocket assembly 10 in accordance with the first embodiment.

Eleventh Embodiment

A bicycle rear sprocket assembly 1110 in accordance with an eleventh embodiment will be described below referring to FIG. 14. The bicycle rear sprocket assembly 1110 has the same configuration as the bicycle rear sprocket assembly 10 except for the first support member 26 and the second support member 28. Elements having substantially the same function as those in the above embodiments will be numbered the same here, and will not be described again in detail here for the sake of brevity.

Figure 14:
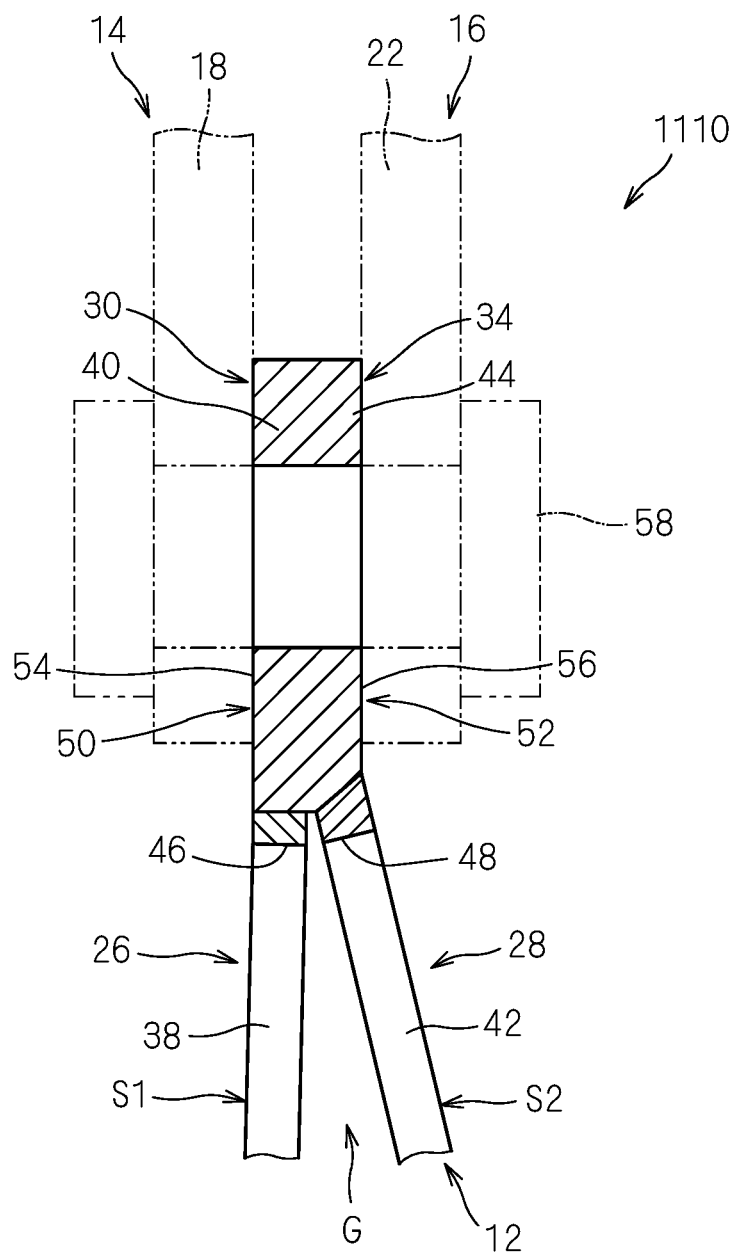
FIG. 14 is a partial cross-sectional view of a bicycle rear sprocket assembly in accordance with an eleventh embodiment.

As seen in FIG. 14, in the bicycle rear sprocket assembly 1110, the first radially outer portion 30 of the first support member 26 is provided integrally with the second radially outer portion 34 of the second support member 28 as a single unitary member. Specifically, the first radially outer parts 40 are respectively provided integrally with the second radially outer parts 44 as a single unitary member.

However, the first radially outer portion 30 is a separate member from the first arms 38. The first radially outer parts 40 respectively are separate members from the first arms 38. The first radially outer parts 40 are attached to the first arms 38 via one of adhesive, diffusion bonding, and caulking. For example, the first radially outer portion 30 and the first arms 38 include a metallic material. The first radially outer portion 30 (the first radially outer parts 40) is attached to the first arms 38 via diffusion bonding.

Similarly, the second radially outer portion 34 is a separate member from the second arms 42. The second radially outer parts 44 respectively are separate members from the second arms 42. The second radially outer parts 44 are attached to the second arms 42 via one of adhesive, diffusion bonding, and caulking. For example, the second radially outer portion 34 and the second arms 42 include a metallic material. The second radially outer portion 34 (the second radially outer parts 44) is attached to the second arms 42 via diffusion bonding.

With the bicycle rear sprocket assembly 1110, it is possible to obtain the same effects as those of the bicycle rear sprocket assembly 10 in accordance with the first embodiment.

Twelfth Embodiment

A bicycle rear sprocket assembly 1210 in accordance with a twelfth embodiment will be described below referring to FIG. 15. The bicycle rear sprocket assembly 1210 has the same configuration as the bicycle rear sprocket assembly 10 except for the sprocket support member 12. Elements having substantially the same function as those in the above embodiments will be numbered the same here, and will not be described again in detail here for the sake of brevity.

Figure 15:
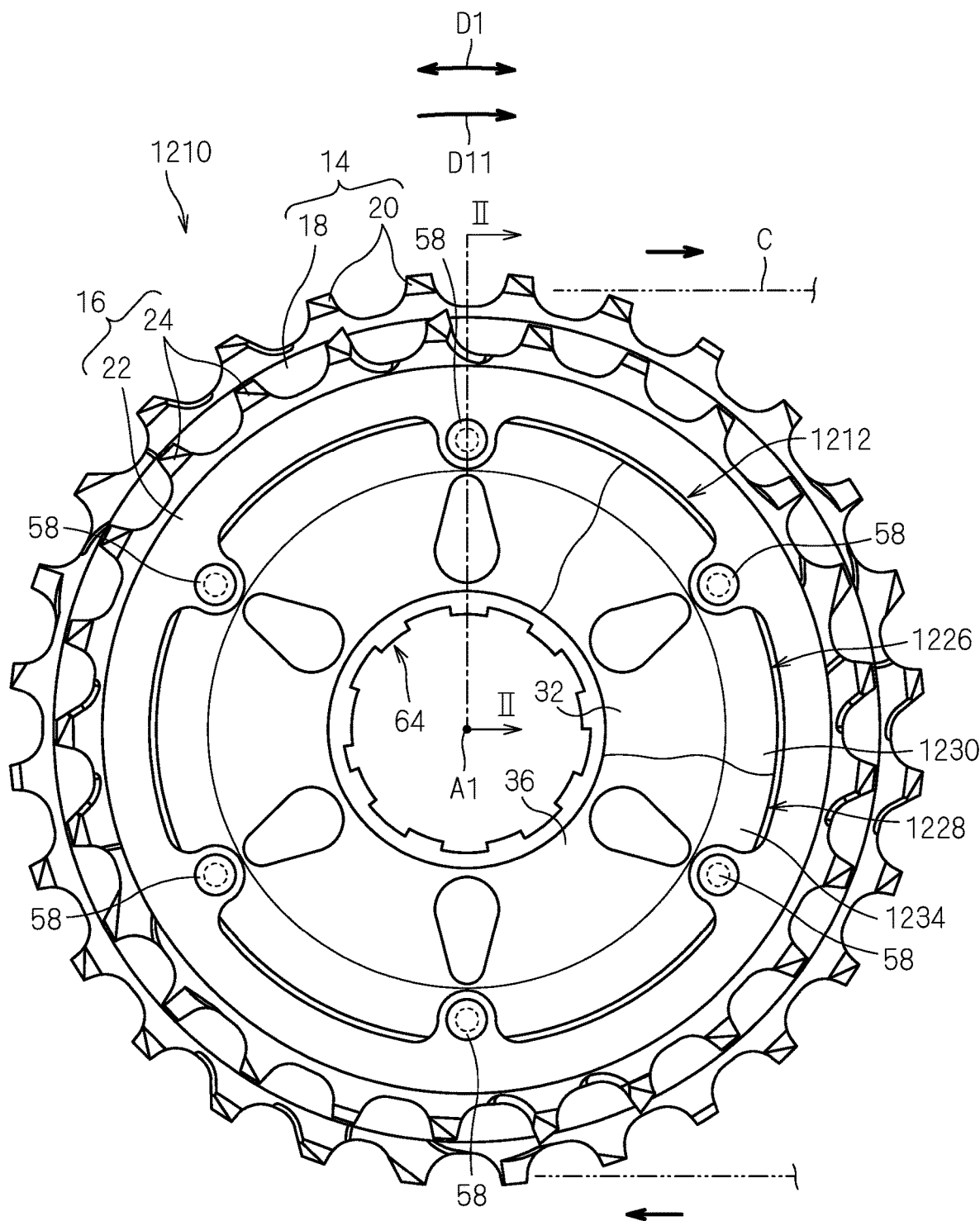
FIG. 15 is a side elevational view of a bicycle rear sprocket assembly in accordance with a twelfth embodiment.

As seen in FIG. 15, the bicycle rear sprocket assembly 1210 comprises a sprocket support member 1212. The sprocket support member 1212 comprises a first support member 1226 and a second support member 1228. At least one of the first support member 1226 and the second support member 1228 has an annular shape when viewed from in the axial direction D2. In this embodiment, each of the first support member 1226 and the second support member 1228 has an annular shape when viewed from in the axial direction D2.

Specifically, the first support member 1226 includes a first radially outer portion 1230 and the first radially inner portion 32. The first radially outer portion 1230 has substantially the same structure as that of the first radially outer portion 30 in the first embodiment. Unlike the first radially outer portion 30, however, the first radially outer portion 1230 has an annular shape.

The second support member 1228 includes a second radially outer portion 1234 and the second radially inner portion 36. The second radially outer portion 1234 has substantially the same structure as that of the second radially outer portion 34 in the first embodiment. Unlike the second radially outer portion 34, however, the second radially outer portion 1234 has an annular shape.

With the bicycle rear sprocket assembly 1210, it is possible to obtain the same effects as those of the bicycle rear sprocket assembly 10 in accordance with the first embodiment.

Thirteenth Embodiment

A bicycle rear sprocket 1310 in accordance with a thirteenth embodiment will be described below referring to FIGS. 16 and 17. The bicycle rear sprocket 1310 has the same configuration as the bicycle rear sprocket assembly 10 except for the first sprocket 14, the second sprocket 16, the first sprocket attachment portion 50, and the second sprocket attachment portion 52. Elements having substantially the same function as those in the above embodiments will be numbered the same here, and will not be described again in detail here for the sake of brevity.

Figure 16:
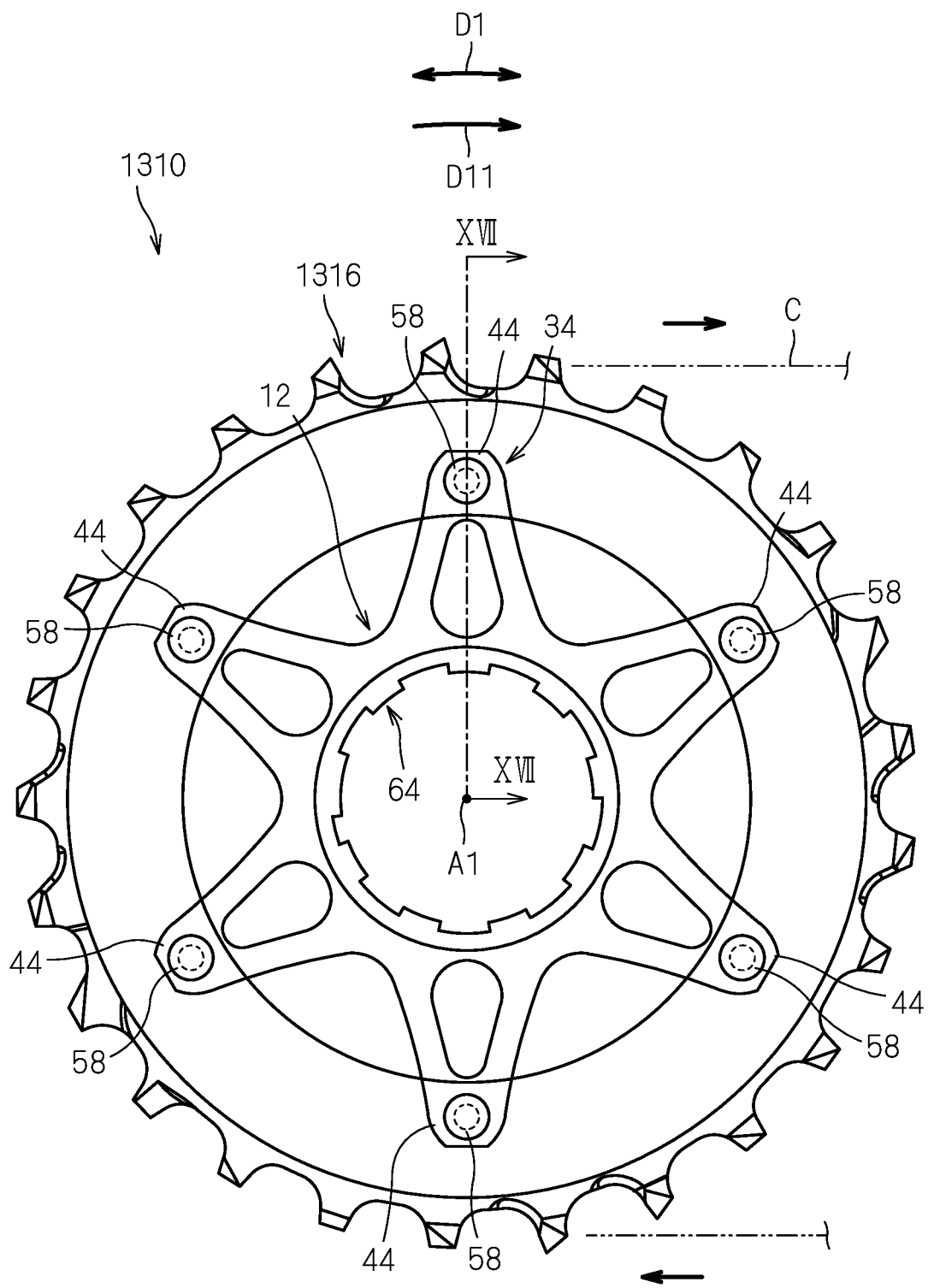
FIG. 16 is a side elevational view of a bicycle rear sprocket assembly in accordance with a thirteenth embodiment.
Figure 17:
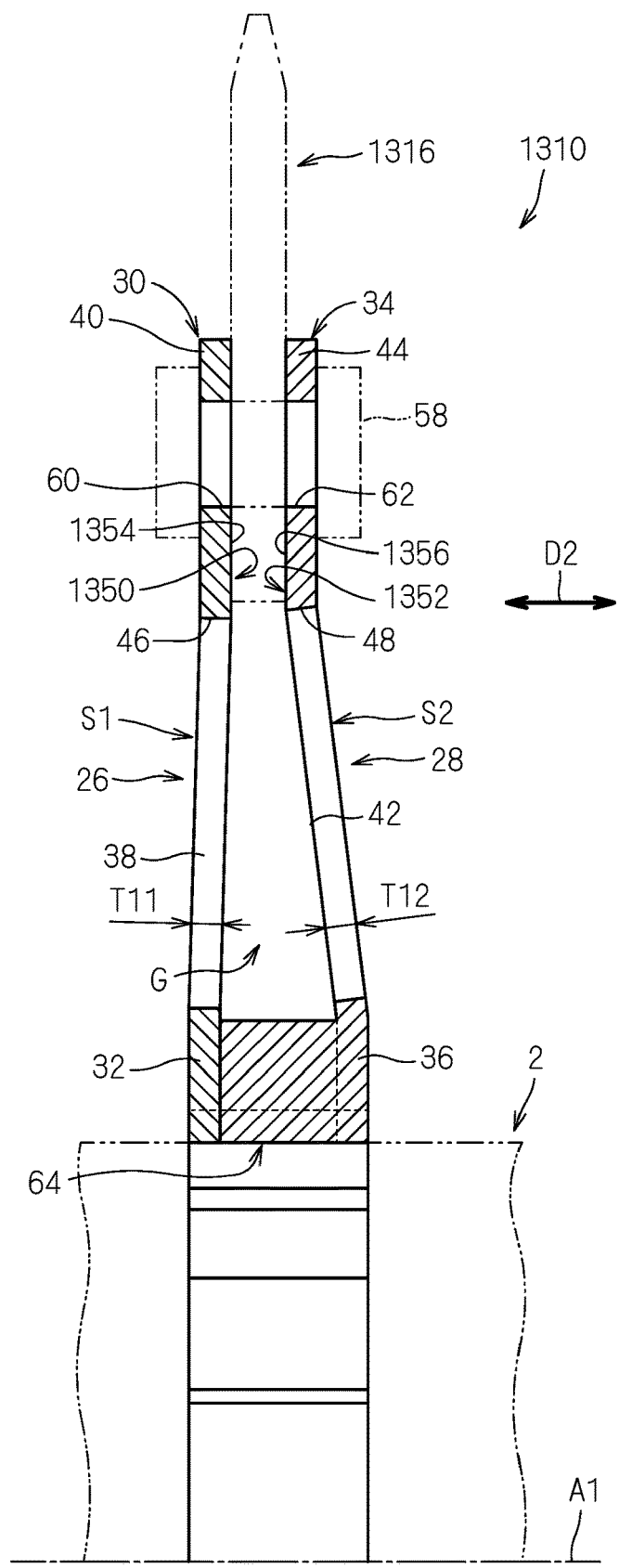
FIG. 17 is a partial cross-sectional view of the bicycle rear sprocket assembly taken along line XVII-XVII of FIG. 16.

As seen in FIGS. 16 and 17, the bicycle rear sprocket 1310 comprises a first attachment portion 1350 and a second attachment portion 1352 instead of the first sprocket attachment portion 50 and the second sprocket attachment portion 52. The first radially outer portion 30 of the first support member 26 is configured to be attached to the second radially outer portion 34 of the second support member 28 via a bicycle sprocket 1316 positioned between the first attachment portion 1350 and the second attachment portion 1352 in the axial direction D2. The bicycle sprocket 1316 has substantially the same structure as that of the second sprocket 16 in the first embodiment. The bicycle sprocket 1316 is attached to the first sprocket attachment portion 50 and the second sprocket attachment portion 52 via e.g. the rivets 58. The bicycle sprocket 1316 may also be attached to the first sprocket attachment portion 50 and the second sprocket attachment portion 52 via one of caulking, adhesive, integral molding, and diffusion bonding.

The first attachment portion 1350 is provided at the first radially outer portion 30 of the first support member 26. The second attachment portion 1352 is provided at the second radially outer portion 34 of the second support member 28. The first radially outer portion 30 is spaced apart from the second radially outer portion 34 in the axial direction D2. The first attachment portion 1350 is spaced apart from the second attachment portion 1352 in the axial direction D2. The first attachment portion 1350 and the second attachment portion 1352 are provided between the first radially outer portion 30 and the second radially outer portion 34 in the axial direction D2.

The first sprocket attachment portion 50 includes a first surface 1354. The second sprocket attachment portion 52 includes a second surface 1356. The first surface 1354 faces the second surface 1356 in the axial direction D2. The first surface 1354 is in contact with the bicycle sprocket 1316 in a state where the bicycle sprocket 1316 is attached to the first attachment portion 1350. The second surface 1356 is in contact with the bicycle sprocket 1316 in a state where the bicycle sprocket 1316 is attached to the second attachment portion 1352.

With the bicycle rear sprocket 1310, the first support member 26 faces the second support member 28 in the axial direction D2 to define the axial gap G provided between the first support member 26 and the second support member 28 in the axial direction D2. Accordingly, it is possible to save weight of the bicycle rear sprocket 1310 with maintaining the desired strength of the bicycle rear sprocket 1310.

It will be apparent to those skilled in the bicycle field from the present disclosure that the structures of the above embodiments can be at least partially combined with each other.

In the present application, the term "attached" or "attaching", as used herein, can encompass configurations in which an element is directly attached to the other element by affixing the element directly to the other element; configurations in which the element is indirectly attached to the other element via the intermediate member(s); and configurations in which one element is integral with the other element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rear sprocket assembly comprising:
   a sprocket support member rotatable about a rotational center axis, the sprocket support member having a first axial side and a second axial side opposite to the first axial side in an axial direction parallel to the rotational center axis, the sprocket support member comprising:
   a first support member including a first radially outer portion and a first radially inner portion, the first support member at least partly constituting the first axial side; and
   a second support member including a second radially outer portion and a second radially inner portion, the second support member at least partly constituting the second axial side, the first support member facing the second support member in the axial direction to define an axial gap provided between the first support member and the second support member in the axial direction, the axial gap being an open space that extends from at least a portion of the first support member to at least a portion of the second support member in the axial direction;
   a first attachment portion provided at the first radially outer portion of the first support member;
   a second attachment portion provided at the second radially outer portion of the second support member; and
   the first radially outer portion of the first support member being configured to be attached to the second radially outer portion of the second support member via a bicycle sprocket positioned between the first attachment portion and the second attachment portion in the axial direction.

2. The bicycle rear sprocket assembly according to claim 1, wherein
   the first radially outer portion is spaced apart from the second radially outer portion in the axial direction.

3. The bicycle rear sprocket assembly according to claim 1, wherein
   the first attachment portion is spaced apart from the second attachment portion in the axial direction.

4. The bicycle rear sprocket assembly according to claim 1, wherein
   the first attachment portion includes a first surface,
   the second attachment portion includes a second surface, and
   the first surface faces the second surface in the axial direction.

5. The bicycle rear sprocket assembly according to claim 4, wherein
   the first surface is in contact with the bicycle sprocket in a state where the bicycle sprocket is attached to the first attachment portion, and
   the second surface is in contact with the bicycle sprocket in a state where the bicycle sprocket is attached to the second attachment portion.

6. The bicycle rear sprocket assembly according to claim 1, further comprising:
a hub engagement portion with which a bicycle hub assembly is to be engaged.

7. The bicycle rear sprocket assembly according to claim 6, wherein
the hub engagement portion is a separate member from at least one of the first radially inner portion of the first support member and the second radially inner portion of the second support member.

8. The bicycle rear sprocket assembly according to claim 7, wherein
the first radially inner portion is configured to be attached to the second radially inner portion via the hub engagement portion.

9. The bicycle rear sprocket assembly according to claim 6, wherein
the hub engagement portion is provided integrally with at least one of the first radially inner portion of the first support member and the second radially inner portion of the second support member as a single unitary member, and
the hub engagement portion is directly attached to an other of the at least one of the first radially inner portion of the first support member and the second radially inner portion of the second support member.

10. A bicycle rear sprocket assembly comprising:
a sprocket support member rotatable about a rotational center axis, the sprocket support member having a first axial side and a second axial side opposite to the first axial side in an axial direction parallel to the rotational center axis, the sprocket support member comprising:
a first support member including a first radially outer portion and a first radially inner portion, the first support member at least partly constituting the first axial side; and
a second support member including a second radially outer portion and a second radially inner portion, the second support member at least partly constituting the second axial side, the first support member facing the second support member in the axial direction to define an axial gap provided between the first support member and the second support member in the axial direction;
a first attachment portion provided at the first radially outer portion of the first support member;
a second attachment portion provided at the second radially outer portion of the second support member; and
the first radially outer portion of the first support member being configured to be attached to the second radially outer portion of the second support member via a bicycle sprocket positioned between the first attachment portion and the second attachment portion in the axial direction, wherein
the first radially outer portion includes first radially outer parts,
the second radially outer portion includes second radially outer parts,
each of the first radially outer parts includes a first attachment hole,
each of the second radially outer parts includes a second attachment hole, and
a rivet extends through the first attachment hole and the second attachment hole.

11. A bicycle rear sprocket assembly comprising:
a sprocket support member rotatable about a rotational center axis, the sprocket support member having a first axial side and a second axial side opposite to the first axial side in an axial direction parallel to the rotational center axis, the sprocket support member comprising:
a first support member including a first radially outer portion and a first radially inner portion, the first support member at least partly constituting the first axial side; and
a second support member including a second radially outer portion and a second radially inner portion, the second support member at least partly constituting the second axial side, the first support member facing the second support member in the axial direction to define an axial gap provided between the first support member and the second support member in the axial direction;
a first attachment portion provided at the first radially outer portion of the first support member;
a second attachment portion provided at the second radially outer portion of the second support member; and
a hub engagement portion with which a bicycle hub assembly is to be engaged, wherein
the first radially outer portion of the first support member being configured to be attached to the second radially outer portion of the second support member via a bicycle sprocket positioned between the first attachment portion and the second attachment portion in the axial direction, and
the hub engagement portion is provided integrally with at least one of the first radially inner portion of the first support member and the second radially inner portion of the second support member as a single unitary member.

* * * * *